US007350311B2

(12) United States Patent
Marks

(10) Patent No.: US 7,350,311 B2
(45) Date of Patent: Apr. 1, 2008

(54) PIPE CUTTING TEMPLATE

(76) Inventor: James Marks, 317 E. Pine St., Ville Platte, LA (US) 70586

( * ) Notice: Subject to any disclaimer, the term of this patent is extended or adjusted under 35 U.S.C. 154(b) by 0 days.

(21) Appl. No.: 11/398,781

(22) Filed: Apr. 5, 2006

(65) Prior Publication Data

US 2006/0225291 A1 Oct. 12, 2006

Related U.S. Application Data

(60) Provisional application No. 60/549,421, filed on Apr. 6, 2005.

(51) Int. Cl.
*B43L 9/00* (2006.01)
*B23K 37/00* (2006.01)

(52) U.S. Cl. ............................ 33/563; 33/1 B; 33/529

(58) Field of Classification Search .................. 33/1 B, 33/1 SB, 529, 562, 563, 565, 566; D10/64
See application file for complete search history.

(56) References Cited

U.S. PATENT DOCUMENTS

| | | | | |
|---|---|---|---|---|
| 776,713 | A | 12/1904 | Wurts | |
| 1,568,876 | A * | 1/1926 | Campbell et al. | 33/561.2 |
| 1,683,953 | A | 9/1928 | Carr | |
| 1,991,117 | A | 2/1935 | Porteous et al. | |
| 2,272,860 | A | 2/1942 | Wolfe | |
| 2,327,058 | A | 8/1943 | O'Keefe | |
| 2,380,919 | A | 8/1945 | Bugenhagen | |
| 2,389,286 | A | 11/1945 | Watkins | |
| 2,466,464 | A * | 4/1949 | Moore | 33/529 |
| 2,615,255 | A | 10/1952 | Rankin | |
| 2,653,387 | A | 9/1953 | Cameron | |
| 2,659,972 | A | 11/1953 | Norris | |
| 2,659,981 | A | 11/1953 | Beckham | |
| 2,671,273 | A | 3/1954 | Barnes | |
| 2,813,343 | A * | 11/1957 | Bruning | 33/21.3 |
| 2,832,139 | A | 4/1958 | Ayers | |
| 2,842,857 | A | 7/1958 | Whitten | |
| 3,128,560 | A * | 4/1964 | McKenzie | 33/529 |
| 3,209,459 | A | 10/1965 | Fish, Jr. | |
| 3,442,500 | A | 5/1969 | Fall | |
| 3,456,468 | A * | 7/1969 | Crippen | 72/31.05 |
| 3,790,144 | A | 2/1974 | Waldron | |
| RE28,033 | E * | 6/1974 | Hannon | 235/70 R |
| 3,835,541 | A | 9/1974 | Whitworth | |
| 3,944,194 | A | 3/1976 | Robinson | |
| 4,202,535 | A | 5/1980 | Eriksson | |
| 4,215,481 | A | 8/1980 | Riley | |
| 4,216,945 | A | 8/1980 | Krieg | |
| 4,277,894 | A | 7/1981 | Duhe | |
| 4,367,593 | A | 1/1983 | Whitworth | |
| 4,419,828 | A | 12/1983 | Farris | |
| 4,565,012 | A | 1/1986 | Bilodeau et al. | |

(Continued)

*Primary Examiner*—Alexander R. Smith
(74) *Attorney, Agent, or Firm*—Keaty Professional Law Corporation

(57) ABSTRACT

A universal reusable template for cutting ends of cylindrical objects such as pipes, in preparation for joining the cylindrical objects to other cylindrical bodies. The template is formed as a flat flexible bendable sheet with magnetic properties allowing the sheet to be temporarily secured on a metal pipe. The front face of the sheet has reference indicia corresponding to contour lines of a desired cut to be made in the end of the cylindrical body. The cut lines represent most conventional types and sizes of lateral-type cuts, eccentric cuts and saddle-type cuts, with pipe diameters ranging from about 3" to about 24".

32 Claims, 4 Drawing Sheets

U.S. PATENT DOCUMENTS

| | | | | |
|---|---|---|---|---|
| 4,618,378 | A | 10/1986 | Huckaby | |
| 4,650,952 | A | 3/1987 | Akeel | |
| 4,653,195 | A | 3/1987 | Esparza | |
| 4,693,567 | A | 9/1987 | Ozaki | |
| 4,793,066 | A | 12/1988 | Cheng | |
| D319,794 | S | 9/1991 | Elkins | |
| 5,450,677 | A | 9/1995 | Casey | |
| 5,860,220 | A | 1/1999 | Gerd | |
| 6,049,987 | A * | 4/2000 | Robell | 33/1 B |
| 6,219,930 | B1 * | 4/2001 | Reid | 33/562 |
| 6,470,578 | B1 | 10/2002 | Phuly et al. | |
| 6,560,887 | B2 | 5/2003 | Byrnes | |
| 6,710,929 | B2 * | 3/2004 | Phuly et al. | 359/641 |
| 7,003,893 | B1 * | 2/2006 | Phuly | 33/529 |
| 7,251,902 | B1 * | 8/2007 | Mueller | 33/562 |
| 2003/0116001 | A1 | 6/2003 | Potter | |

* cited by examiner

PIPE CUTTING TEMPLATE

CROSS-REFERENCE RELATED APPLICATIONS

This application is a non-provisional application based on my provisional application No. 60/594,421 filed on Apr. 6, 2005 for "J Marks Universal Template," the full disclosure of which is incorporated by reference herein and priority of which is hereby claimed.

BACKGROUND OF THE INVENTION

This invention relates to a device for cutting cylindrical objects, and more particularly to a template for cutting pipe ends in order to provide the pipe end of a suitable contour or profile for connecting at an angle to another pipe or surface.

Pipes and pipe conduits are used in many industrial and non-industrial structures and facilities for a variety of purposes. It is often necessary to join one cylindrical component to another at a perpendicular or a non-perpendicular angle relative to one another. The angle of connection in most cases ranges from 30 to 90 degrees. Most of the metal pipes are joined by welding.

When joining pipe ends together, the pattern of intersection between the pipe ends must be marked in order to allow the components to be appropriately cut and welded to ensure a secure and firm connection. The ends of the pipe are contoured or profiled to fit very close against the surface of the other cylindrical components in a secure manner. If the pipe ends do not fit close to the adjoining surfaces, an excessive deposit of weld metal will be needed to completely enjoin, which increases the cost of fabrication, time of welding and creates a possibility of weakened joints. Considering that in many cases, the pipes of various diameters are joined together, the task is made even more difficult.

Various instruments exist for marking the pipe ends in order to allow the receiving components to be appropriately cut and welded together. Some devices use optical marking instruments, such as laser, others use rotary arms with a beam or adjusting instrument that is rotated to mark the cut line. Most of the conventional cutting and mechanical tools for measuring and adjusting the cut lines have a number of functional and mechanical limitations that require a certain degree of skill and experience from the cutter.

As an alternative to complicated mechanical devices, many builders prefer to use standard templates for joining certain size pipes at certain angles. There is a plurality of such templates, each dedicated to a particular task, specific size of the pipes, the angle of connection, as well as the place of actual orientation of the pipe components.

The present invention contemplates elimination of drawbacks associated with the prior art and provision of a single universal template that can be used for marking cutting lines in a variety of situations, accommodating different type pipes and angles of connection.

SUMMARY OF THE INVENTION

It is therefore an object of the present invention to provide a template for cutting pipe ends.

It is another object of the present invention to provide a template for generating pipe cut lines for cylindrical objects of various diameters.

These and other objects of the present invention are achieved through a provision of a reusable template device for forming cutting contours on a cylindrical body in preparation for securing the cylindrical body with another cylindrical body. The cylindrical bodies may be pipes. The device comprises a flat flexible bendable sheet carrying a plurality of reference indicia defined on a front surface of the sheet. The sheet has magnetic properties to allow temporary securing of the sheet on a metal cylindrical body.

The reference indicia comprises cutting contour reference lines, said reference indicia differing in the dimensions and contours based on a desired angle of connection between the cylindrical bodies and diameter of the cylindrical bodies to be joined. Each reference line identifies a discreet number of marking points transferable from the sheet to the cylindrical body to be cut. The contour reference lines may have different color lines depending on a type of cut to be made on the cylindrical body and may be made with a paint substance visible in the dark.

In operation, the user determines a selection criterion with respect to position of the reference line on the sheet based on the sizes of the two cylindrical bodies that are to be secured together and the relative angle of connection between the cylindrical bodies. The user then makes a plurality of marking points by making punch marks through the template sheet and forming small marking indentations in the end of the cylindrical body to be cut.

The user then follows the marking indentations when performing the cut, and cuts the end of the cylindrical body following the contour lines identified by the marking points. The universal template allows making different types of cuts, including lateral-type cuts, saddle-type cuts and eccentric-type cuts, with cylindrical objects having different diameters, typically between 3" and 24".

BRIEF DESCRIPTION OF THE DRAWINGS

Reference will now be made to the drawings wherein like parts are designated by like numerals, and wherein.

DETAILED DESCRIPTION OF THE PREFERRED EMBODIMENTS

Figure 1:
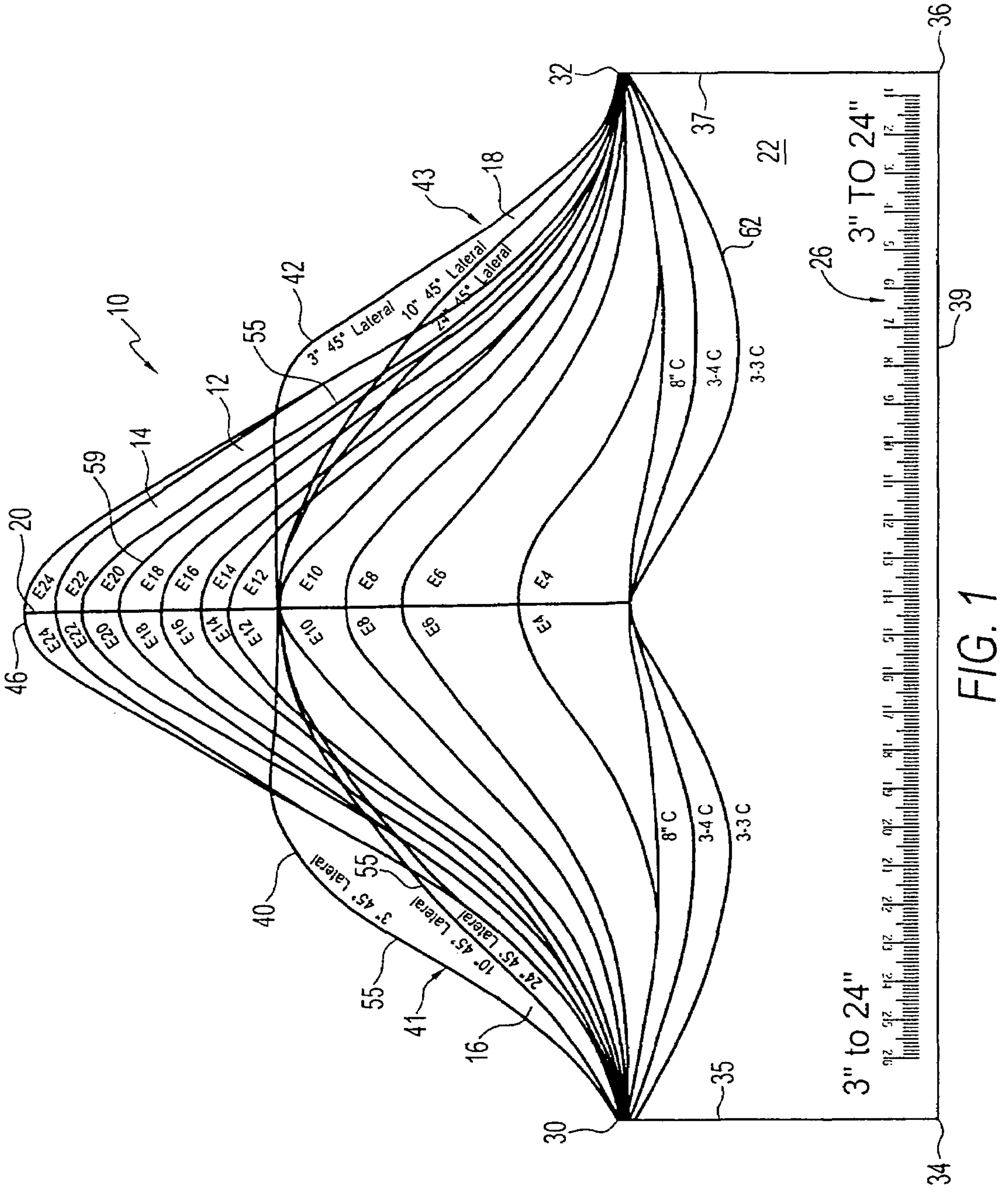
FIG. 1 is a front elevation of the template device in accordance with the present invention.

Turning now to the drawings in more detail, numeral 10 desigantes the template device in accordance with the present invention. As can be seen in the drawings, the template 10 comprises a template body 12 having a plurality of reference indicia on a front surface thereof. The indicia comprises reference cut lines for intersecting pipes depending on the angle of intersection between trunk pipes and branch pipe, as well as the size of the joining pipes.

The indicia correspond to the configuration of the pipe end that will be cut following arcuate cut lines, as will be explained in more detail hereinafter. The body 12 is formed as a flat sheet from a flexible bendable magnet material that allows the device 12 to be positioned on metal pipes and temporarily secured thereto through the magnetic force, allowing the user to use both hands when making markings on the pipe for subsequent cutting. The flat sheet of the body 12 has planar sides and edges coextensive with a perimeter of the sheet.

The body 12 comprises an upper portion 14, a first side portion 16 and second side portion 18. A center reference line 20 extends from the upper portion 14 through the side portions 16 and 18, graphically dividing the template body 12 into two mirror-image halves. A lower part 22 of the device 10 can be provided with measuring indicia 26 which can be in a metric or non-metric system of measurements. The measuring indicia 26 extends from a first lower corner 34 to a second lower corner 36 of the body 12, along the bottom of the device 10. The measuring indicia 26 is not shown in FIG. 5 for clarity of illustrating position of reference marking points for subsequent pipe cutting.

The first lower corner 34 is formed by a side 35 and a bottom edge 37, which intersect at a right angle. The second lower corner 36 is formed by a side 39 and the bottom edge 37, which intersect at a right angle.

The side 35 terminates at an upper corner 30 formed opposite the corner 34. The side 37 terminates at an upper corner 32, which is formed opposite the corner 36. A first intermediate side edge 41 is defined by an inwardly concave line, which extends between the corner 30 and a left intermediate edge 40. A second intermediate side edge 43 is defined by an inwardly concave line, which extends between the upper corner 32 and a right intermediate edge 42. The edges 40 and 42 are defined by outwardly convex lines. The upper portion 14 of the body 12 has a generally sinusoidal wave configuration with an apex 46.

Figure 2:
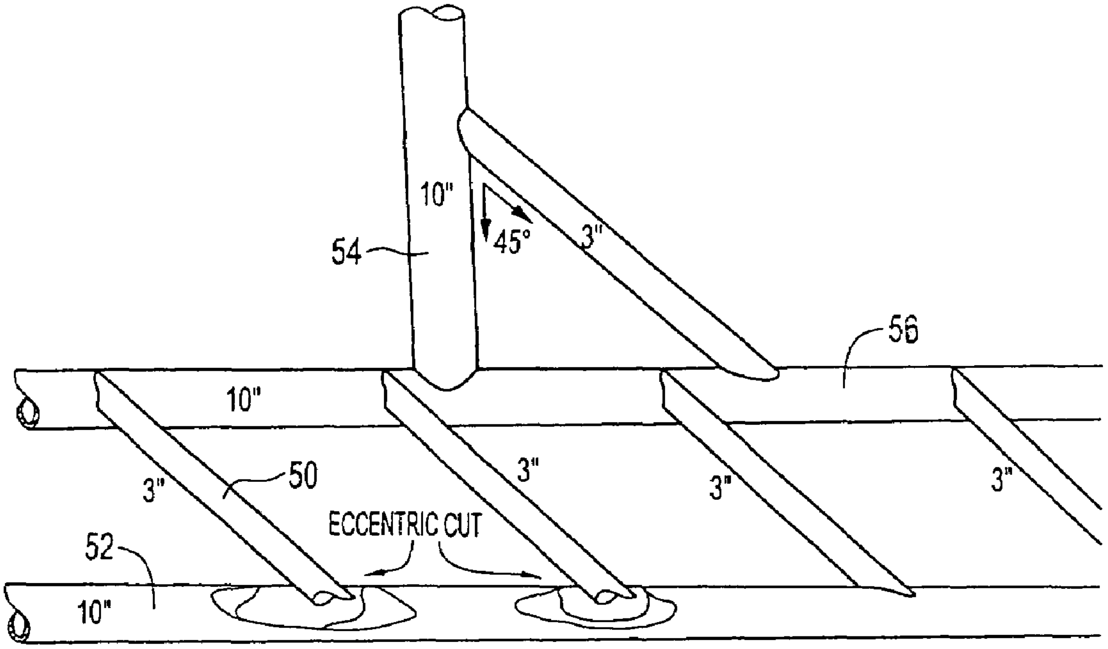
FIG. 2 is a perspective partially cut away view, illustrating various types of connecting angles between adjoining pipes.
Figure 3:
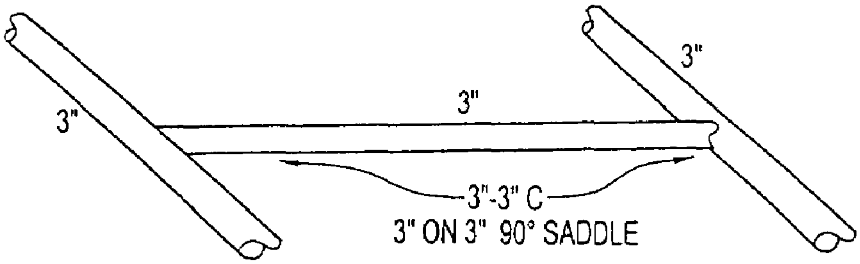
FIG. 3 is a perspective view of a saddle-type connection of the pipes.
Figure 4:
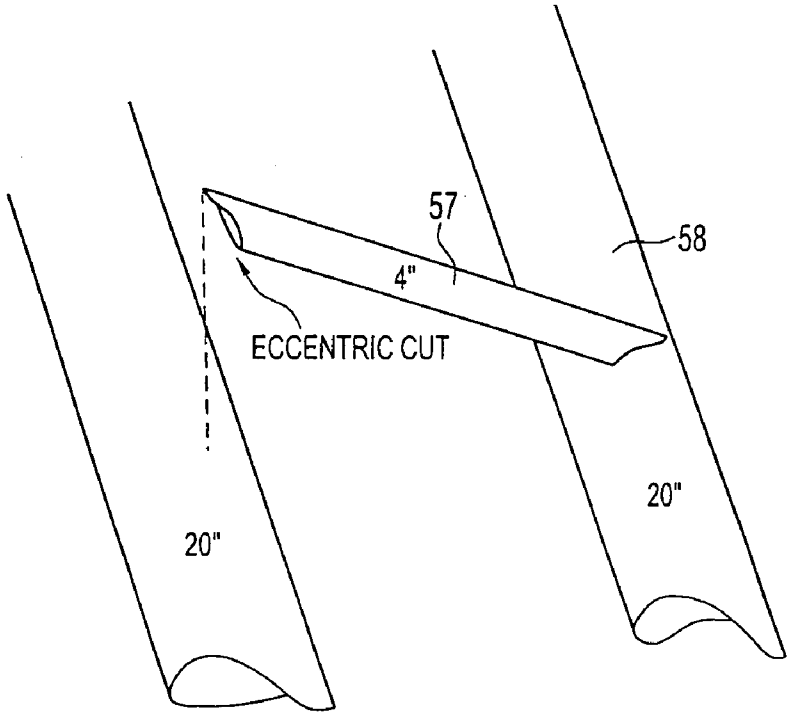
FIG. 4 is a perspective view illustrating an eccentric cut for the adjoining pipes.

The types of cut that are made in the end of the pipe depend on the relationship between the intersecting pipe and whether the pipes serve as conduits. Typical connections between the pipes can be classified as lateral, saddle, and eccentric. Examples of such pipe connections are shown in FIGS. 2, 3 and 4. When the pipe ends need to be cut for eccentric cuts, such as shown in FIG. 2, a 3-inch branch pipe 50 is joined with a 10-inch trunk pipe 52. The pipes 50 and 52, in the illustrations shown in FIG. 2, are on the same elevation and can be used in a variety of applications, for instance installing a grading for work on an offshore platform.

Figure 5:
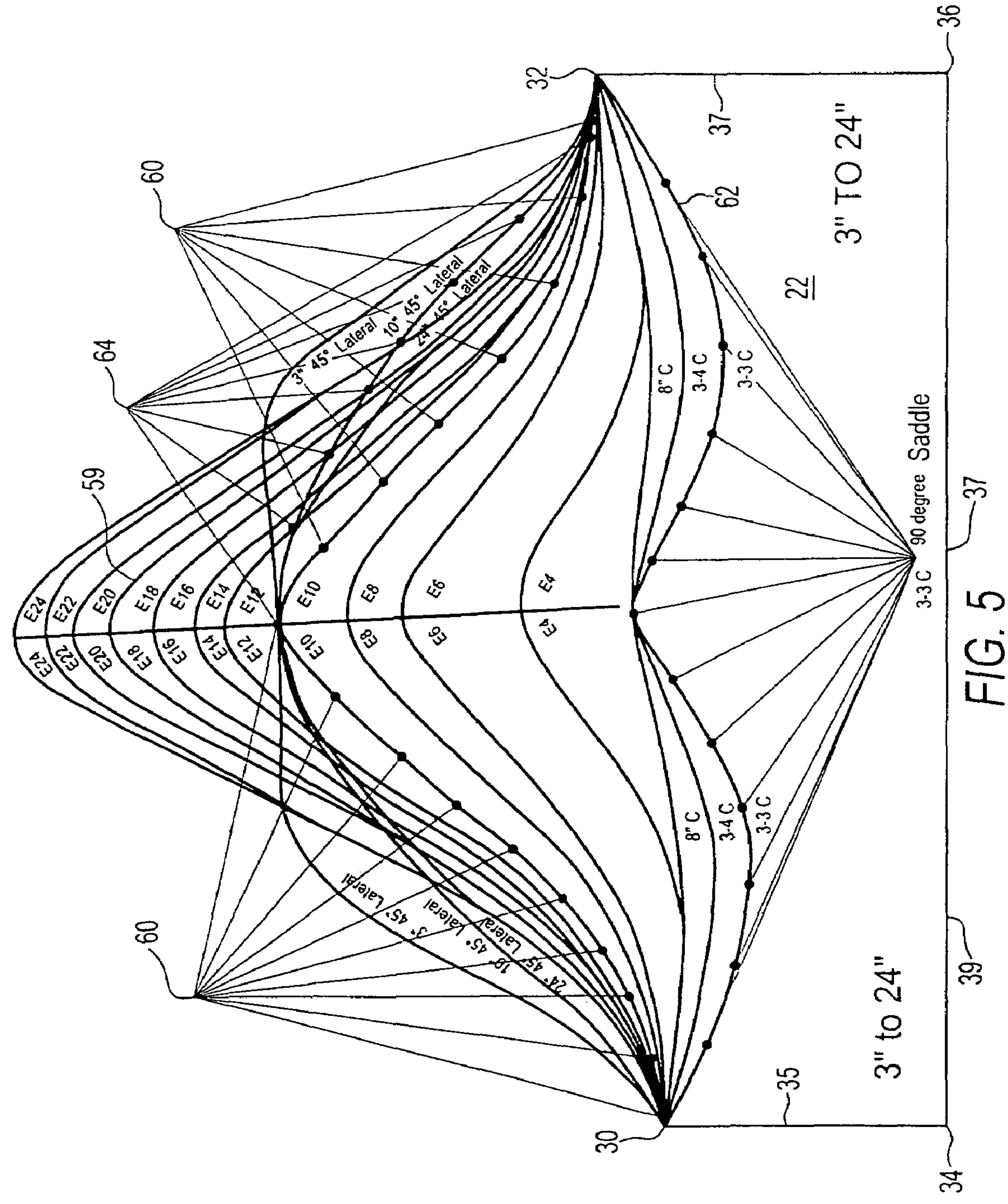
FIG. 5 is a schematic view of the device of the present invention illustrating the marking points along the cut lines for a particular type cut.

Cutting lines for the eccentric cuts are schematically designated by lines "E" in FIGS. 1 and 5. For the example of marking a cut line for the 3-inch pipe to a 10-inch pipe connection, the user follows line E10 illustrated in FIGS. 1 and 5. In operation, the user wraps the magnetically-charged device 10 around a pipe and allows the magnetic force to retain the template 10 in place. The user then makes a plurality of perforations 60, about ¾" apart along the line designated as E10. The perforations extend through the body of the template and make indentations in the pipe that the pipe fitter is prepared to cut and weld with the torch or other cutting implement. The user then makes a cut following the marking points made in the end of the pipe. Similarly, with the trunk pipe 52 having a diameter of 12", the user follows line E12; with the trunk pipe having 24" diameter—line E24, etc.

FIG. 4 shows an eccentric cut for 20-inch elevation that can be required for making a walkway in an offshore location. The method of cutting the end of the 4-inch branch pipe 57 to properly join with the trunk pipe 58 is similar to the method described above. The user follows a line 59 on both sides of the centerline 20 for producing a symmetrical curve, which is then followed to make the desired cut.

When the job requires that a saddle cut be performed, which is usually associated with a 90-degree connection between a trunk pipe and a branch pipe, such as shown in FIG. 3, the user again positions the device 10 around the pipe and allows the device 10 to be magnetically secured on the pipe. The user then makes markings 62 following the lines identified by the letter "C." When the pipes have the same diameters, such as 3" diameter connection of FIG. 3, the user selects the indicia following the line 3-3C of FIGS. 1 and 5. Different diameter pipe ends can be cut following the outline of the cut lines 3-4C or 8"C.

The method of marking the pipe for a saddle joint is similar to the one described above: the user makes markings by executing perforations through the body 12, following the cut lines "C." A pipe cutter can then follow the small indentations in the surface of the pipe to cut the pipe end.

Another typical type of a joint between the pipes is the so-called "lateral cut" connection. In such types of connections, the pipes are typically connected at 45-degree angles as shown in FIG. 2. In the example shown in FIG. 2, a 3-inch branch pipe is connected as a lateral to a trunk pipe 54 and the trunk pipe 56. The user selects one of the indicia lines designated as "lateral" that are imprinted on the template device 10. The connection can be designated as 3" 45-degree lateral, 10" 45-degree lateral, or 24" 45-degree lateral. Of course, it will be understood by persons skilled in the art that other typically used pipe diameters can be defined by cut lines 55.

Similarly to the above-described examples, the user wraps the ends of the body 12 around the pipe end, with the lower portion 22 being inwardly of the cut edge. The user then makes punch marks 64 through the body of the template device 10 making small indentations in the surface of the pipe to be cut. The indentations serve as a guide for the pipe cutter to follow when making preparation for joining the pipes together.

The indicia lines on the template can be made of different colors for different types of cuts to facilitate line selection for the user. If desired, the lines can be made using a compound with phosphorus or other substance to allow the lines to be seen in the dark.

The universal template of the present invention allows outlining cut lines in preparation for the welding jobs for use with pipes and cuts of different types. The indicia on the template allow forming a precise curve of the cut line that can be followed by the cutter for execution of close fit between the joining pipes and other such cylindrical objects. The branch pipe can then be fitted onto the trunk pipe and welded into position with a resultant closely fitting joint without the need for the cut-and-try experiment that can produce imperfect cuts.

The template device 10 of the present invention can be used many times and in place of prior size-specific cutting templates. The perforations made in the body of the template will serve again and again for making markings on the pipe ends. The template 10 provides a universal template for various geometrical forms for use on pipes and for joining cylindrical objects and conduits required in industrial applications.

The use of the template is easy, accurate to a fraction of an inch. The template 10 is inexpensive to use and manufacture. The template 10 can be used for performing cuts on pipe ends having diameters from about 3" to about 24".

Many other possible embodiments of this invention may be made without departing from the spirit thereof. I therefore pray that my rights to the present invention be limited only by the scope of the appended claims.

I claim:

1. A reusable template device for forming cutting contours on a cylindrical body in preparation for securing the cylindrical body with another cylindrical body, the device comprising: a flat sheet carrying a plurality of reference indicia defined on a front surface of the sheet, said reference indicia comprising cutting contour reference lines corresponding to a plurality of pipe diameters and angles of desired cutting, said reference indicia differing in the dimensions and contours based on a desired angle of connection between the cylindrical bodies and diameter of the cylindrical bodies to be joined.

2. The device of claim 1, wherein each of said reference lines identifies a discreet number of marking points transferable from the sheet to the cylindrical body to be cut.

3. The device of claim 2, wherein said sheet comprises an upper part and an intermediate part.

4. The device of claim 3, wherein said upper part has a general configuration of a sinusoidal wave.

5. The device of claim 3, wherein said indicia comprises a vertical center line dividing the upper part and the intermediate part into mirror-image halves.

6. The device of claim 3, wherein the upper part and the intermediate part carry reference indicia defining marking points for an eccentric-type cut.

7. The device of claim 3, wherein the intermediate part carries reference indicia defining marking points for lateral-type cut and saddle-type cut.

8. The device of claim 1, wherein said sheet is formed from a flexible material to facilitate installation of the template around the circumference of the cylindrical body.

9. The device of claim 1, wherein said sheet has magnetic properties to allow temporary securing of the sheet on a metal cylindrical body.

10. The device of claim 1, wherein said sheet has a bottom edge, and wherein said reference indicia comprises measuring indicia imprinted along the bottom edge of the sheet.

11. The device of claim 1, wherein said contour reference lines have different color lines depending on a type of cut to be made on the cylindrical body.

12. The device of claim 11, wherein said color lines are made with a paint substance visible in the dark.

13. The device of claim 1, wherein the cylindrical body is a pipe.

14. A method of cutting a cylindrical object according to a pattern of predetermined cut in preparation of the cylindrical object being joined with another body, comprising the steps:

providing a template in the form of a flat sheet having planar sides coextensive with a perimeter of the sheet and having reference indicia imprinted, said indicia comprising cutting contour reference lines corresponding to a plurality of pipe diameters and angles of desired cutting, said reference indicia differing in the dimensions and contours based on a desired angle of connection between the cylindrical object to another body and diameter of the cylindrical body, to which the cylindrical object is prepared to be joined;

positioning said template over the cylindrical object; determining a selection criterion with respect to position of the reference line on the sheet based on a size of the cylindrical object and the cylindrical body and the angle of connection between the cylindrical object and the cylindrical body; and forming marking points in the cylindrical object by puncturing, at predetermined intervals, the sheet along the selected reference line and transferring the marking points to the cylindrical object; cutting the cylindrical object, while following the marking points.

15. The method of claim 14, wherein the step of selection criterion comprises a step of identifying a type of cut to be made in the cylindrical object.

16. The method of claim 15, wherein the type of cut is selected from a group comprising a lateral-type cut, an eccentric-type cut and a saddle-type cut.

17. The method of claim 14, wherein said sheet is formed from a flexible material to facilitate installation of the template around the circumference of the cylindrical object.

18. The method of claim 14, wherein said sheet is formed from a magnetic material allowing the sheet to be temporary detachably secured on a metal cylindrical object.

19. The method of claim 14, wherein the cylindrical object is a pipe.

20. The method of claim 14, further comprising a step of forming said contour reference lines of different color depending on a type of cut to be made on the cylindrical object.

21. The method of claim 20, wherein said color lines are made with a paint substance visible in the dark.

22. A template device for cutting an end of a pipe in preparation for joining with another pipe, the device comprising: a flat sheet formed from a flexible material, said sheet being configured and dimensioned to correspond to the perimeter of an arcuately shaped cut end of a pipe, said sheet carrying a plurality of reference indicia defined on a front surface of the sheet, said reference indicia comprising cutting contour reference lines corresponding to a plurality of pipe diameters and angles of desired cutting, said reference indicia differing in the dimensions and contours based on a desired angle of connection between the cut pipe and a pipe to be joined, and diameter of the pipes to be joined.

23. The device of claim 22, wherein each of said reference lines identifies a discreet number of marking points transferable from the sheet to the pipe to be cut by puncturing the sheet and forming corresponding marking points on the end of the pipe.

24. The device of claim 22, wherein said sheet has magnetic properties to allow temporary detachable securing of the sheet on a metal pipe.

25. The device of claim 22, wherein said sheet has a bottom edge, and wherein said reference indicia comprises measuring indicia imprinted along the bottom edge of the sheet.

26. The device of claim 22, wherein said sheet comprises an upper part and an intermediate part.

27. The device of claim 26, wherein said upper part has a general configuration of a sinusoidal wave.

28. The device of claim 26, wherein said indicia comprises a vertical center line dividing the upper part and the intermediate part into mirror-image halves.

29. The device of claim 26, wherein the upper part and the intermediate part carry reference indicia defining marking points for an eccentric-type cut.

30. The device of claim 26, wherein the intermediate part carries reference indicia defining marking points for lateral-type cut and saddle-type cut.

31. The device of claim 22, wherein said contour reference lines have different color lines depending on a type of cut to be made on the end of the pipe.

32. The device of claim 31, wherein said color lines are made with a paint substance visible in the dark.

* * * * *